Figure 1:
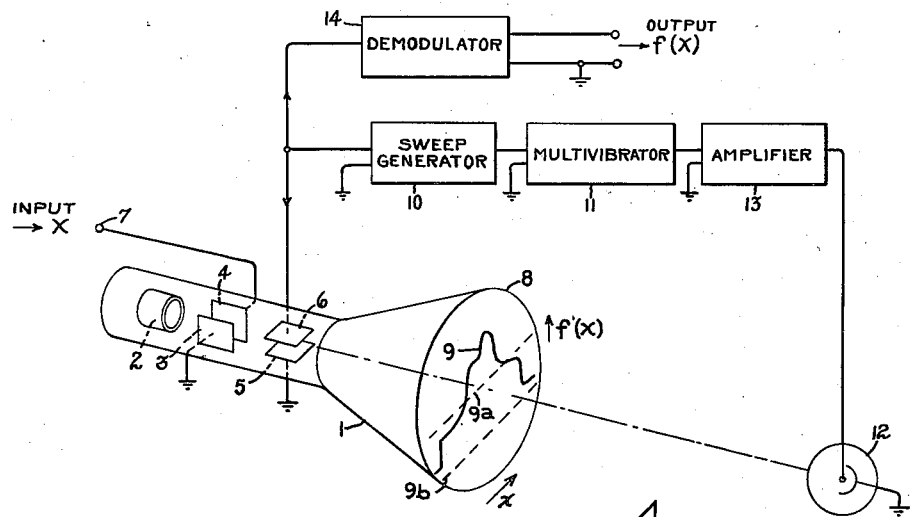

Oct. 20, 1953     R. P. HAVILAND     2,656,101
ARBITRARY FUNCTION GENERATOR
Filed April 26, 1951     2 Sheets-Sheet 1

Inventor:
Robert P. Haviland,
by *Claude H. Mace*
His Attorney.

Oct. 20, 1953  R. P. HAVILAND  2,656,101
ARBITRARY FUNCTION GENERATOR
Filed April 26, 1951  2 Sheets-Sheet 2

Inventor:
Robert P. Haviland,
by Claude A. Mott
His Attorney.

Patented Oct. 20, 1953

2,656,101

UNITED STATES PATENT OFFICE 2,656,101

ARBITRARY FUNCTION GENERATOR

Robert P. Haviland, Scotia, N. Y., assignor to General Electric Company, a corporation of New York Application April 26, 1951, Serial No. 223,105

1 Claim. (Cl. 235—61)

My invention relates to computing and analyzing devices, such as differential analyzers and analogue computers, and more particularly to arbitrary function generators for such devices.

In the solution of scientific and engineering problems concerning interrelated physical phenomena, computing and analyzing devices are often advantageously employed to give quick and accurate results on either a quantitative or qualitative basis. This is done in some instances by assembling a model electrical system device (in some cases a mechanical or electromechanical system) which is analogous to the physical system under study, or which follows the same governing mathematical relationships as the physical system under study.

The present invention is particularly adapted for use in such electrical system devices, commonly known as analogue computers, although it is to be understood that the present invention may also be used in mechanical and electromechanical system devices. The electric analogue computer employs electric signals; i. e., voltages and currents, as dependent variables of time as an independent variable, the variable voltages or currents being generated by suitable electric or electronic circuits and operated upon by adding, integrating, differentiating, multiplying, and other mathematically acting circuit components. The solution of a problem set up upon such an electric analogue computer, then, appears as a voltage varying with time, and since the repetition rate of the input voltage is high and the circuit action fast, the problem may be solved many times each second and the solution viewed as a stationary curve on a cathode ray tube screen.

In the solution of many problems on analogue computers, the need arises for generating an electrical signal which is a given arbitrary function of either the independent variable, time, or of a dependent variable represented by an electrical signal varying with time. Such arbitrary functions many times are not reducible to a mathematical expression, or at least not reducible to a mathematical expression easily simulated by electrical components as are simple integral and differential functions. Various devices to yield a mechanical or electrical output signal which varies according to an arbitrary function of a mechanical or electrical input signal have been built and generally classified as arbitrary function generators.

It is an object of my invention to provide a new and improved arbitrary function generator for use in computing or analyzing devices.

It is a further object of my invention to provide an arbitrary function generator which is capable of generating an arbitary function of either a dependent or independent variable.

Another object of my invention is to provide an arbitrary function generator for which the desired arbitrary function may be easily, economically, and quickly changed, as is desired in the case of a trial and error type problem.

A further object of my invention is to provide an arbitrary function generator which can store, or "remember," the solution of a previous problem, and use it as an input to a subsequent problem.

A still further object of my invention is to provide an arbitrary function generator which is fast in operation, permitting the generated function to be repeated many times in one second.

In carrying out my invention in one form thereof, I provide a conventional cathode ray tube having vertical deflection plates and horizontal deflection plates, and draw an opaque line representing the desired output function of the input variable on the outer face of the cathode ray tube screen with a suitable grease pencil or crayon. As will appear from the following description of my invention, the opaque function line need not be on the face of the cathode ray tube so long as it is positioned in front of its screen which provides a luminescent spot when subjected to the impact of its electron beam. A voltage varying with time according to the input variable is applied to a set of deflection plates, say the horizontal deflection plates, in order that the electron beam of the cathode ray tube is swept horizontally according to the input variable. I further provide means to rapidly sweep the electron beam vertically back and forth across the screen while being swept horizontally; such means in a preferred form being embodied in a vertical sweep generator controlled by a multivibrator. A scanning device, such as a photoelectric cell, is placed opposite the screen of the cathode ray tube and arranged to supply a voltage pulse to the multivibrator each time that the light falling on the scanning device is decreased due to the electron beam falling behind the opaque function line which is positioned in front of the screen. The voltage pulse from the scanning device triggers the multivibrator to start the new vertical deflection cycle, with the result that the amplitudes of the vertical deflections are limited to the height of the opaque function line of the electron beam. Accordingly, the amplitudes of the voltage output of the sweep generator are proportional to the value of the desired output function for the instantaneous value of the input variable. Thus, the envelope formed by the output signals from the sweep generator is the desired function of the input variable. Filtering means of a demodulator receives, together with the vertical deflection plates of the cathode ray tube, the output voltage of the sweep generator, and separates the envelope of the varying amplitude sweep voltage to yield a final voltage output that varies with the input variable voltage according to the arbitrary function curve drawn on the outer side of the cathode ray tube screen.

Figure 2:
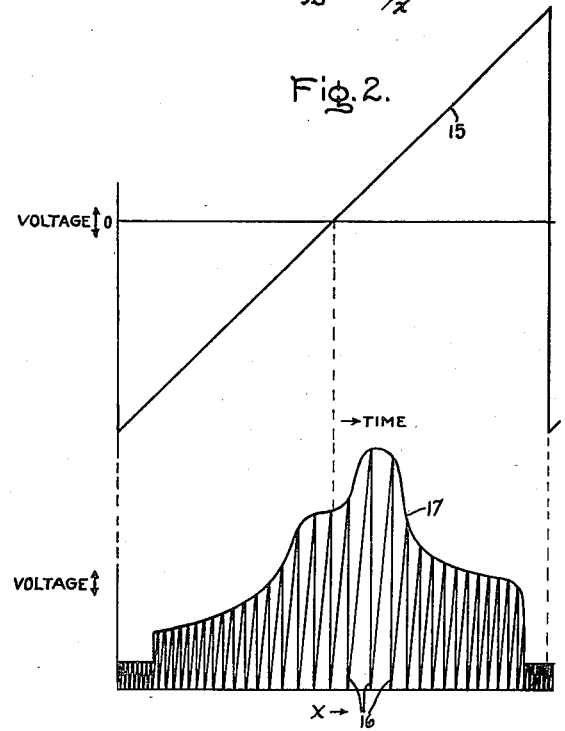
Figure 3:
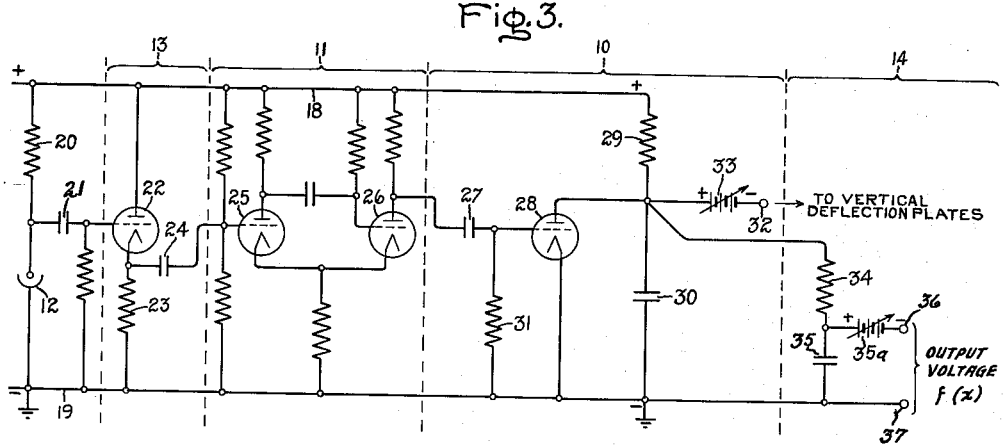
Figure 4:
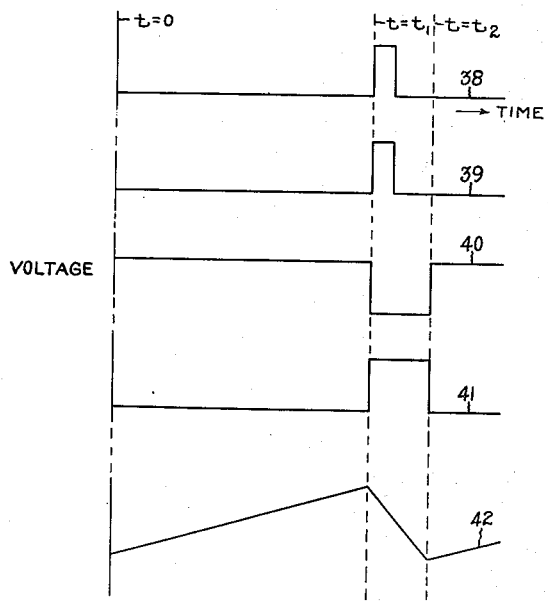

The scope of my invention is pointed out with particularity in the appended claim. However, for consideration of the novel features and for a better understanding of my invention together with further objects and advantages thereof, reference should be had to the following description taken in conjunction with the accompanying drawings in which:

Fig. 1 is an illustration, partly in block and line diagram, of a preferred form of the arbitrary function generator of my invention, Fig. 2 is a graphical illustration showing the relationship between the voltage output of the arbitrary function generator for the special case of an independent time variable voltage input, Fig. 3 is a schematic diagram illustrating an exemplary circuit embodying the components shown by block and line diagram in Fig. 1, and Fig. 4 is a series of curves, drawn to a common time scale, illustrating voltage variations at certain points in the circuit of Fig. 3 during one vertical sweep cycle.

Referring now to Fig. 1, there is shown a preferred form of my arbitrary function generator including a conventional cathode ray tube 1 having an electron gun 2 together with horizontal deflection means such as plates 3 and 4 and vertical deflection means such as plates 5 and 6. Electron gun 2, in a well known manner, provides a beam of electrons traveling with high velocity to strike, after deflection by the deflection plates, a luminescent screen at the right end of the tube, causing an illuminated spot at the point of impact. For the convenience of employing a one-line diagram, plates 3 and 5 have been indicated as connected to ground, as have various other parts of Fig. 1. An input terminal 7 is shown connected to horizontal deflection plate 4 in order that some electrical signal input such as a varying voltage, represented by the symbol X, where X is a function of time, may be applied between plates 3 and 4. On the outer face of cathode ray tube 1 is drawn an opaque curve 9 with ordinates measured vertically from a horizontal axis 9a to represent an arbitrary function of X for abscissae corresponding to values of X measured horizontally along axis 9a. Curve 9 may be quickly and easily applied to outer face 8 by use of a grease pencil, crayon, or other suitable marking means; and only a few seconds are required to erase one such curve and replace it with another.

In order that the electron beam may be swept vertically back and forth across the screen of cathode ray tube 1 between curve 9 and a base line 9b with a frequency much greater than the repetition frequency of the input voltage X, I provide means, such as a sweep generator 10, connected to vertical deflection plate 6 to supply a sawtooth voltage between plates 5 and 6. I further provide means to control sweep generator 10 so that the electron beam is not vertically deflected above the height of curve 9 at any point, such means embodying in this preferred form a multivibrator 11, a scanning device such as a photoelectric cell 12, and a coupling amplifier 13 which may be connected therebetween.

Photoelectric cell 12 is mounted directly in front of outer face 8 to receive light caused by the electron beam striking the screen of cathode ray tube 1 with the result that it supplies a voltage pulse, amplified by amplifier 13, to multivibrator 11 each time that the electron beam falls behind opaque curve 9. Such a voltage pulse triggers multivibrator 11, which, in turn, causes sweep generator 10 to begin a new vertical deflection cycle and return the beam to a base line 9b. Thus the electron beam forms a raster on the cathode ray tube screen, the upper envelope of which is the exact shape of curve 9. Accordingly, the voltage output of sweep generator 10, in order to cause such a raster of the electron beam, is a relatively high frequency sawtooth voltage wave, the envelope of which is the exact shape of the arbitrary function of X represented by curve 9. The voltage output of sweep generator 10 is, therefore, not only applied to deflection plate 6 but also applied to a demodulator 14, the output of which is a voltage varying according to the function of X represented by curve 9, where X represents a function of time applied as an input voltage to horizontal deflection plates 3 and 4.

In Fig. 2 a graphical representation of the input and output voltages of the function generator is shown for the simplest case where the input voltage X is a dependent variable, i. e., the input voltage X varies directly with time. Thus, time is represented by an input voltage wave such as curve 15 and the electron beam in cathode ray tube 1 is swept horizontally across the screen at a uniform rate. Sweep generator 10 during this same time supplies a sawtooth voltage, represented by lines 16, to cause beam to be deflected rapidly and vertically back and forth across the screen between base line 9b and curve 9. Each time that the beam reaches opaque curve 9, light received by photoelectric cell 12 is momentarily decreased and a resulting voltage pulse from photoelectric cell 12 triggers multivibrator 11 causing the vertical sweep voltage to immediately begin a new cycle. Thus for any instantaneous horizontal position of the electron beam, maximum upward vertical deflection of the beam from base line 9b is limited to the corresponding height of curve 9, and the peak deflection voltage output of sweep generator 10 is proportional to that height of curve 9. The envelope 17 formed by the successive peaks of the vertical deflecting voltage from sweep generator 10 has exactly the same wave form as curve 9. Since the sawtooth voltage 16, modulated to the wave form corresponding to curve 9, is applied to demodulating or filtering means such as demodulator 14, the unidirectional output voltage of demodulator 14 has exactly the same wave form as that of curve 9 and is, therefore, the function of X as represented by curve 9.

It will be understood that the input voltage designated by X may have any sort of variation with time, i. e., it may be a dependent variable of time and, therefore, be any function of time. Nevertheless, the output voltage from demodulator 14, in a similar manner to the simple case described, will have a waveform representing a function of X corresponding to the shape of curve 9.

For purposes of illustration, and in no sense by way of limitation, I have shown in Fig. 3 a schematic circuit diagram which embodies the various components indicated by block representation in Fig. 1, designating like components by like numerals. The circuit includes unidirectional voltage supply conductors 18 and 19, the negative supply conductor 19 being shown for convenience at ground potential as a zero reference potential for various voltages to be described. Photoelectric cell 12 is serially connected with an anode resistor 20 across the supply conductors and its anode is connected by a coupling capacitor 21 to the control electrode of an electron discharge device 22.

As indicated by dashed lines, amplifier 13 in this particular circuit is a cathode follower circuit including device 22, a cathode resistor 23, and a capacitor 24 for coupling the output of amplifier 13 to the control electrode of a second electron discharge device 25.

Multivibrator 11 in the preferred circuit of Fig. 3 is a conventional "one-shot" cathode-coupled multivibrator which includes device 25 and a third electron discharge device 26 in a circuit well known to those skilled in the art. Multivibrator 11 is so constructed that device 26 is normally conducting saturation anode current and device 25 is cut off until a positive voltage pulse is applied to the control electrode of device 25. At that instant device 26 is cut off and device 25 begins to conduct anode current but this condition prevails only for a short time, after which the circuit switches automatically to the original conditions with device 26 conducting anode current and device 25 cut off. The output voltage is taken from multivibrator 11 and applied to sweep generator 10 by a coupling capacitor 27 connected between the anode of device 26 and the control electrode of a fourth electron discharge device 28.

Sweep generator 10 includes device 28, and R-C timing circuit made of a resistor 29 and a capacitor 30 connected across supply conductors 18 and 19, and a suitable control electrode leak resistor 31. The anode of device 26 is connected to the junction point of resistor 29 and capacitor 30. The output of sweep generator 10 is applied, from a terminal 32, to vertical deflection plate as shown in Fig. 1.

If the curve 9 on outer face 8 of cathode ray tube 1 is of such height that the base line 9b therefor lies below the center of the screen, an adjustable biasing voltage source such as a battery 33 may be employed to deflect the electron beam to the vertical level of line 9b during the instants that the voltage across capacitor 30 is very small. This is done since the particular circuit shown, without battery 33, produces only positive voltages across capacitor 30 which would result only in vertically upward deflections of the electron beam. Obviously, in the case where base line 9b for curve 9 lies at or above vertical center of the screen, battery 33 is unnecessary.

The output of sweep generator 10 is also applied to demodulator 14 which in a simple form may include a resistor 34 in series with a capacitor 35 to form a low pass filter across capacitor 30. The final output voltage of the arbitrary function generator is taken from terminals 36 and 37 connected across capacitor 35. However, since in the particular circuit shown by Fig. 3 the voltage appearing across capacitor 35 is always positive and since the function represented by curve 9 may have negative ordinates with respect to axis 9a, an adjustable biasing voltage source such as a battery 35a may be employed to establish the zero ordinate level for curve 9. That is, battery 35a is provided to establish, in effect, a horizontal axis 9a from which the ordinates of curve 9 are measured positively upward and negatively downward. The output of the arbitrary function generator, then, may be either positive or negative to represent a function that is either positive or negative. By varying the voltage of battery 35a the vertical position of axis 9a may be adjusted; for positive ordinates of curve 9 the final output voltage is positive, for negative ordinates of curve 9 the final output voltage is negative, and where curve 9 falls on axis 9a, i. e., has a zero ordinate, the final output voltage is zero.

A further description of the arbitrary function generator of Fig. 1 and the circuit of Fig. 3 is best carried out by an explanation of the operation of the circuit, given with particular reference to Fig. 4. In Fig. 4, curve 38 shows the variation of voltage across photoelectric cell 12 during one cycle of the vertical deflection voltage applied to deflection plates 5 and 6, curve 39 similarly shows the variation of voltage across cathode resistor 23, curve 40 similarly shows the variation of voltage across device 25, curve 41 similarly shows the variation of voltage across device 26, and curve 42, in a like manner, shows the voltage variation across capacitor 30.

Assume now that at time $t=0$ the electron beam is at base line 9b, the lower limit of its vertical travel, i. e., the voltage across capacitor 30 is very small and that device 28 is not conducting anode current. This will be assumed as the beginning of the sawtooth voltage cycle. Capacitor 30 then begins to charge at a substantially linear rate through resistor 29, producing a linearly growing voltage thereacross as shown by curve 42, and deflecting the electron beam in cathode ray tube 1 vertically upward. Since photoelectric cell 12 receives light caused by the electron beam, it is conducting anode current and has only a small voltage drop thereacross. However, at time $t=t_1$, the beam arrives at the height of curve 9 and the light produced by the electron beam is momentarily eclipsed by opaque curve 9. Thus, anode current through photoelectric cell 12 is momentarily decreased and a positive voltage pulse appears thereacross as shown in curve 38. As a result of this positive voltage pulse, anode current through device 22 is momentarily increased and a similar positive voltage pulse appears across cathode resistor 23. Thus, device 25, which had been cut off from current flow, is triggered to conduct anode current, the voltage drop thereacross decreasing momentarily as shown by curve 40. This, in turn, momentarily stops anode current flow through device 26, since its control electrode is driven more negative, causing a momentary increase in the voltage across device 26 as shown by curve 41. However, the increase in voltage across device 26 acting through capacitor 27 to the control electrode of device 28, allows anode current to flow through device 28, whereupon capacitor 30 is discharged through device 28. This is a rapid discharge of capacitor 30 and is represented by that portion of curve 42 between time $t=t_1$ and time $t=t_2$, the result being a very rapid return of the electron beam to the base line 9b. Following time $t=t_2$, the cycle just described repeats itself, the electron beam being deflected vertically upward until it falls behind curve 9 and then being rapidly returned to the base line 9b.

As the voltage across capacitor 30 rises to its peak values, capacitor 35 is also charged practically to the same peak voltage. However, as device 28 conducts and rapidly discharges capacitor 30, resistor 34 considerably retards the discharge of capacitor 35, so that the voltage across capacitor 35 follows the voltage envelope formed by the peaks of the sawtooth voltage variations across capacitor 30. In other words, resistor 34 and capacitor 35 act as a well known low pass filter, yielding as an output voltage the envelope of the rapidly varying input sawtooth voltage supplied by capacitor 30.

It will be apparent to those skilled in the computer art that the output voltage of the present arbitrary function generator may be converted into corresponding mechanical motion by the use of a suitable servomechanism, and, similarly, that an input variable in the form of mechanical motion may be converted to electrical form before being applied to the arbitrary function generator. Thus, the arbitrary function generator shown and described in connection with electrical computing devices, may also be employed with mechanical or electromechanical computing devices.

One of the particular advantages of this arbitrary function generator is that it can store, or "remember," the solution of a given problem and use that solution as an input to a subsequent problem. That is, the solution of a problem appearing as a curve on the face of a cathode ray tube may be traced over with a grease pencil or crayon and such solution retained indefinitely on the face of the cathode ray tube. By connecting the same cathode ray tube in the arbitrary function generator, the solution may be used as an input for a new problem to be solved.

The arbitrary function generator described hereinbefore is simple in construction and principle and yet fast and flexible in use. The desired arbitrary function may be quickly changed by erasing curve 9 and drawing another in its place; the speed of response is sufficient to allow the arbitrary function voltage to be generated 60 or more times per second in order that any solution derived from the output voltage be reproduced as a stationary curve on a cathode ray tube screen; and the input variable may be either a dependent or independent variable of the problem to be solved.

Obviously, the principles of the present invention embody the use of a cathode ray tube having magnetic deflection coils in place of the electrostatic deflection plates shown and described; currents instead of voltages would then be employed for the input and output signals. While the present invention has been described by reference to a particular embodiment thereof, it will be understood that numerous modifications may be made by those skilled in the art without actually departing from the spirit of the invention. I, therefore, aim in the appended claim to cover all such equivalent variations as come within the true spirit and scope of the foregoing disclosure.

What I claim as new and desire to secure by Letters Patent of the United States is:

An arbitrary function generator for use in computing devices comprising a cathode ray tube, an electron gun in said cathode ray tube for supplying an electron beam, a luminescent screen in said cathode ray tube for producing light in response to the impact of electrons in said beam, an opaque curve representing an arbitrary function drawn on the outer face of said screen with horizontal abscissae and vertical ordinates, horizontal and vertical deflection plates in said cathode ray tube, said horizontal deflection plates being supplied with an input voltage signal representing a variable, a photoelectric cell for receiving light from said screen, a multivibrator controlled by said photoelectric cell, a sweep generator controlled by said multivibrator for producing a sawtooth voltage output to be applied to said vertical deflection plates, the maximum vertical deflections of said beam being limited to the height of said curve by voltage pulses produced across said photoelectric cell when said light is eclipsed by said curve, said voltage pulses triggering said multivibrator to cause said sweep generator to begin a new output cycle, and a filtering circuit to produce a voltage envelope of said sawtooth voltage output, said voltage envelope representing the same arbitrary function of said variable as the arbitrary function represented by said curve.

ROBERT P. HAVILAND.

References Cited in the file of this patent
UNITED STATES PATENTS

| Number | Name | Date |
|---|---|---|
| 2,461,667 | Sunstein | Feb. 15, 1949 |
| 2,474,380 | Simmons | June 28, 1949 |
| 2,528,020 | Sunstein | Oct. 31, 1950 |